(12) United States Patent
Nagao et al.

(10) Patent No.: US 10,126,048 B2
(45) Date of Patent: Nov. 13, 2018

(54) FLOATING LIQUEFIED-GAS PRODUCTION FACILITY

(71) Applicant: MITSUBISHI HEAVY INDUSTRIES COMPRESSOR CORPORATION, Tokyo (JP)

(72) Inventors: Hideki Nagao, Hiroshima (JP); Masahiro Kobayashi, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 208 days.

(21) Appl. No.: 14/893,638

(22) PCT Filed: Apr. 7, 2014

(86) PCT No.: PCT/JP2014/060085
§ 371 (c)(1),
(2) Date: Nov. 24, 2015

(87) PCT Pub. No.: WO2015/155818
PCT Pub. Date: Oct. 15, 2015

(65) Prior Publication Data
US 2016/0116209 A1    Apr. 28, 2016

(51) Int. Cl.
*F25J 1/00*       (2006.01)
*F01K 23/10*      (2006.01)
(Continued)

(52) U.S. Cl.
CPC ............. *F25J 1/0022* (2013.01); *B63B 35/44* (2013.01); *F01K 23/10* (2013.01); *F02C 3/22* (2013.01);
(Continued)

(58) Field of Classification Search
CPC .......... F25J 1/0022; F25J 3/08; F25J 2220/66; F25J 1/0055; F25J 1/0259; F25J 1/0278;
(Continued)

(56) References Cited

U.S. PATENT DOCUMENTS 3,925,047 A * 12/1975 Harper .................. B01D 53/26
                                                                  208/188
4,041,721 A    8/1977 Kniel
(Continued)

FOREIGN PATENT DOCUMENTS

CN     1067114 A    12/1992
CN     1162063 A    10/1997
(Continued)

OTHER PUBLICATIONS

Extended European Search Report dated Aug. 12, 2016, for European Application No. 14888921.5.
(Continued)

*Primary Examiner* — Keith Raymond
*Assistant Examiner* — Webeshet Mengesha
(74) *Attorney, Agent, or Firm* — Birch, Stewart, Kolasch & Birch, LLP (57) ABSTRACT

This floating liquefied-gas production facility (1) is equipped with: a gas turbine unit (20); a liquefaction facility (90) that has a primary refrigeration compressor (40) driven by the gas turbine unit (20), and cools natural gas; a drum-circulation-type exhaust heat recovery boiler (30) that recovers the energy of exhaust heat from the gas turbine unit (20) as steam; a component separation system (85) that uses the steam generated by the drum-circulation-type exhaust heat recovery boiler (30) as a heat source to separate components in natural gas obtained from the ocean floor, and sends said components to the liquefaction facility (90); and a fuel gas supply device (100) that compresses end-flash gas
(Continued)

and/or boil-off gas, and supplies said compressed gas to the gas turbine unit (20) as fuel.

9 Claims, 7 Drawing Sheets (51) Int. Cl.
*F02C 3/22* (2006.01)
*F02C 7/22* (2006.01)
*B63B 35/44* (2006.01)
*F25J 3/08* (2006.01)
*F25J 1/02* (2006.01)

(52) U.S. Cl.
CPC ............... *F02C 7/22* (2013.01); *F25J 1/023* (2013.01); *F25J 1/0242* (2013.01); *F25J 1/0259* (2013.01); *F25J 1/0278* (2013.01); *F25J 1/0283* (2013.01); *F25J 3/08* (2013.01); *B63B 2035/4473* (2013.01); *F25J 2220/64* (2013.01); *F25J 2220/66* (2013.01); *F25J 2230/22* (2013.01); *F25J 2230/30* (2013.01); *F25J 2230/60* (2013.01); *F25J 2240/70* (2013.01); *F25J 2240/82* (2013.01); *Y02E 20/16* (2013.01); *Y02P 80/154* (2015.11); *Y02P 80/156* (2015.11)

(58) Field of Classification Search
CPC .... F25J 1/0283; F25J 2220/64; F25J 2230/22; F25J 2230/30; F25J 2230/60; F25J 2240/70; B63B 35/44; F02C 7/22; F01K 23/10
See application file for complete search history.

(56) References Cited

U.S. PATENT DOCUMENTS

| | | | |
|---|---|---|---|
| 5,025,860 A | 6/1991 | Mandrin | |
| 5,943,881 A | 8/1999 | Grenier | |
| 6,094,937 A | 8/2000 | Paurola et al. | |
| 7,713,497 B2 | 5/2010 | Mak | |
| 2002/0026783 A1 | 3/2002 | Utamura | |
| 2002/0170312 A1 | 11/2002 | Reijnen et al. | |
| 2004/0129019 A1 | 7/2004 | Jones, Jr. et al. | |
| 2004/0134196 A1 | 7/2004 | Jones, Jr. et al. | |
| 2006/0213222 A1 | 9/2006 | Whitesell | |
| 2010/0242536 A1 | 9/2010 | Paradowski et al. | |
| 2010/0263406 A1* | 10/2010 | Dam | F25J 1/0022 62/613 |
| 2010/0275644 A1 | 11/2010 | Koganezawa et al. | |
| 2013/0283825 A1 | 10/2013 | Bernays et al. | |
| 2014/0130509 A1* | 5/2014 | Drnevich | F02C 6/18 60/780 |
| 2014/0260251 A1* | 9/2014 | Shapot | F01K 23/06 60/648 |

FOREIGN PATENT DOCUMENTS

| | | |
|---|---|---|
| CN | 1402827 A | 3/2003 |
| CN | 1685187 A | 10/2005 |
| CN | 102438726 A | 5/2012 |
| JP | 52-11590 A | 1/1977 |
| JP | 2-296990 A | 12/1990 |
| JP | 4-366303 A | 12/1992 |
| JP | 10-68586 A | 3/1998 |
| JP | 2001-526376 A | 12/2001 |
| JP | 2002-195054 A | 7/2002 |
| JP | 2007-198200 A | 8/2007 |
| JP | 2011-17341 A | 1/2011 |
| JP | 2012-83051 A | 4/2012 |
| JP | 2013-545657 A | 12/2013 |
| WO | WO 99/30094 A1 | 6/1999 |
| WO | WO 2008/139527 A1 | 11/2008 |
| WO | WO 2009/093315 A1 | 7/2009 |
| WO | WO 2009/096028 A1 | 8/2009 |

OTHER PUBLICATIONS

Festen et al., "Choices for LNG FPSO's," Offshore Technology Conference, XP009120275, May 4-7, 2009, pp. 1-9.
Kaart et al., "A Novel Design for 10-12 MTPA LNG Trains," International Conference and Exhibition on Liquefied Natural Gas, XP009108430, vol. 15, Apr. 24, 2007, pp. PS2-3.1-PS2-3.11.
Raseau et al., "How to Reduce CO2 Emissions in the LNG Chain," International Conference and Exhibition on Liquefied Natural Gas, XP009108458, vol. 15, Apr. 24, 2007, pp. PS2-7.1-PS2-7.19.
International Search Report, issued in PCT/JP2014/060085, dated Jun. 17, 2014.
Written Opinion of the International Searching Authority, issued in PCT/JP2014/060085, dated Jun. 17, 2014.
Chinese Office Action and Search Report, dated Jun. 3, 2016, for counterpart Chinese Application No. 201480030002.3 with an English translation.
Japanese Notice of Allowance and English translation thereof, dated Jun. 21, 2016, for counterpart Japanese Application No. 2015-546753.

* cited by examiner

FLOATING LIQUEFIED-GAS PRODUCTION FACILITY

TECHNICAL FIELD

The present invention relates to a floating liquefied-gas production facility.

BACKGROUND ART

A facility equipped with a gas turbine may be mounted on a overwater facility used in a state in which it floats on water, such as a ship and a floating structure equipped with a floating body (a float) that floats on water.

As the facility equipped with the gas turbine, for example, there are a facility which extracts and liquefies natural gas from a marine gas field and loads the natural gas into a gas tank provided in a gas carrier, and a power generation facility in which the gas turbine drives a generator.

To enhance the efficiency of such a facility, there is a gas turbine combined cycle (GTCC) facility which generates steam in an exhaust gas boiler using an exhaust gas from the gas turbine, and drives the compressor and the generator for liquefying the natural gas in a steam turbine driven by the steam.

Patent Document 1 discloses a configuration in which a gas turbine, a generator and the like are installed at the top of a support frame and an exhaust gas boiler is installed at the bottom thereof for installation in a small space in such a GTCC facility.

Patent Document 2 discloses a natural gas liquefaction plant which is capable of preventing a decrease in the operating efficiency of the entire plant.

PRIOR ART DOCUMENTS

Patent Document

[Patent Document 1]
Japanese Unexamined Patent Application, First Publication No. 2002-195054
[Patent Document 2]
Pamphlet of PCT International Publication No. WO 2008/139527

SUMMARY OF THE INVENTION

Problem to be Solved by the Invention

However, when a facility of the configuration described in Patent Document 1 or 2 is to be installed on a overwater facility, such as a ship or a floating structure, there are following problems.

First, since the installation areas of various facilities are limited in a overwater facility, it is desirable to reduce an installation area of the GTCC facility as much as possible.

In addition, since the size of a storage facility of fuel for driving a gas turbine and a boiler in the overwater facility is limited, it is desirable to operate the overwater facility by efficiently using limited energy.

An object of the present invention is to provide a compact and highly efficient floating liquefied-gas production facility.

Means for Solving the Problem

According to an aspect of the invention, there is provided a floating liquefied-gas production facility which includes a gas turbine unit; a liquefaction device which has a primary refrigeration compressor driven by the gas turbine unit and cools natural gas; a drum-circulation-type exhaust heat recovery device which recovers energy of the exhaust heat of the gas turbine unit as steam; a component separation system which separates the components in the natural gas extracted from the ocean floor and sends the components to the liquefaction device using the steam generated by the drum-circulation-type exhaust heat recovery device as a heat source; and a fuel gas supply device which compresses at least one of an end-flash gas and a boil-off gas and supplies it to the gas turbine unit as a fuel.

In the floating liquefied-gas production facility, since at least one of the end-flash gas and the boil-off gas is used as a fuel to drive the gas turbine unit, a part of the natural gas extracted from the ocean floor can be used as a fuel. Thus, there is no need for a dedicated facility which stores the fuel for driving the gas turbine unit, and it is possible to miniaturize the size of the facility. Further, since the exhaust heat of the gas turbine unit is recovered by the exhaust heat recovery device and is supplied to the component separation system as a heat source for the component separation system, it is possible to effectively utilize energy of the exhaust heat of the gas turbine unit.

The drum-circulation-type exhaust heat recovery device may be horizontally installed.

The component separation system may include an acid gas removal device which removes an acid gas contained in the natural gas extracted from the ocean floor; an antifreeze recycling device which recovers and recycles antifreeze added when extracting the natural gas; and a fractionator which fractionates the natural gas, wherein the acid gas removal device, the antifreeze recycling device and the fractionator may use the steam generated by the exhaust heat recovery device as a heat source.

In this case, since the heat consumed by the component separation system can be supplemented by the exhaust heat, it is possible to effectively utilize the thermal energy which is conventionally not utilized but discarded.

The floating liquefied-gas production facility of the aspect may further have a steam turbine which is driven by the steam generated by the exhaust heat recovery device, and an auxiliary compressor which is driven by the steam turbine, wherein the component separation system may use the steam used in the steam turbine as a heat source.

In this case, by driving the steam turbine using the steam of a high-energy state, and by further using the steam in a low-temperature and low-pressure state due to driving of the steam turbine as a heat source of the component separation system, the utilization efficiency of thermal energy is good.

The auxiliary compressor may have a feed gas compressor which compresses the natural gas supplied to the acid gas removal device, a stabilizer overhead compressor which compresses a condensate gas, a natural gas booster compressor which supplies the natural gas to the liquefaction device, and an end-flash gas compressor which compresses the end-flash gas and the boil-off gas in the fuel gas supply device.

In this case, as long as a process of extracting, purifying and liquefying the raw natural gas continues as a cycle, sufficient power is supplied to the main auxiliary compressor in a liquefied gas production process by the exhaust heat utilization.

Effect of the Invention

According to the present invention, it is to possible to provide a compact and highly efficient floating liquefied-gas production facility.

EMBODIMENTS FOR CARRYING OUT THE INVENTION

Figure 1:
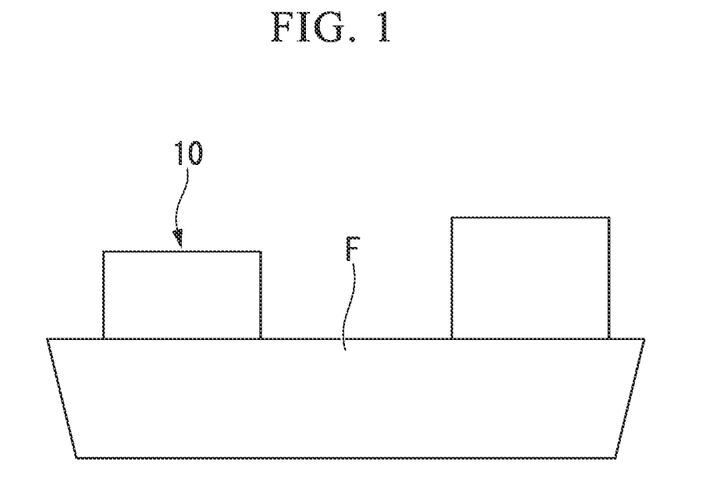
FIG. 1 is a schematic diagram representing a floating liquefied-gas production facility according to an embodiment of the present invention.
Figure 2:
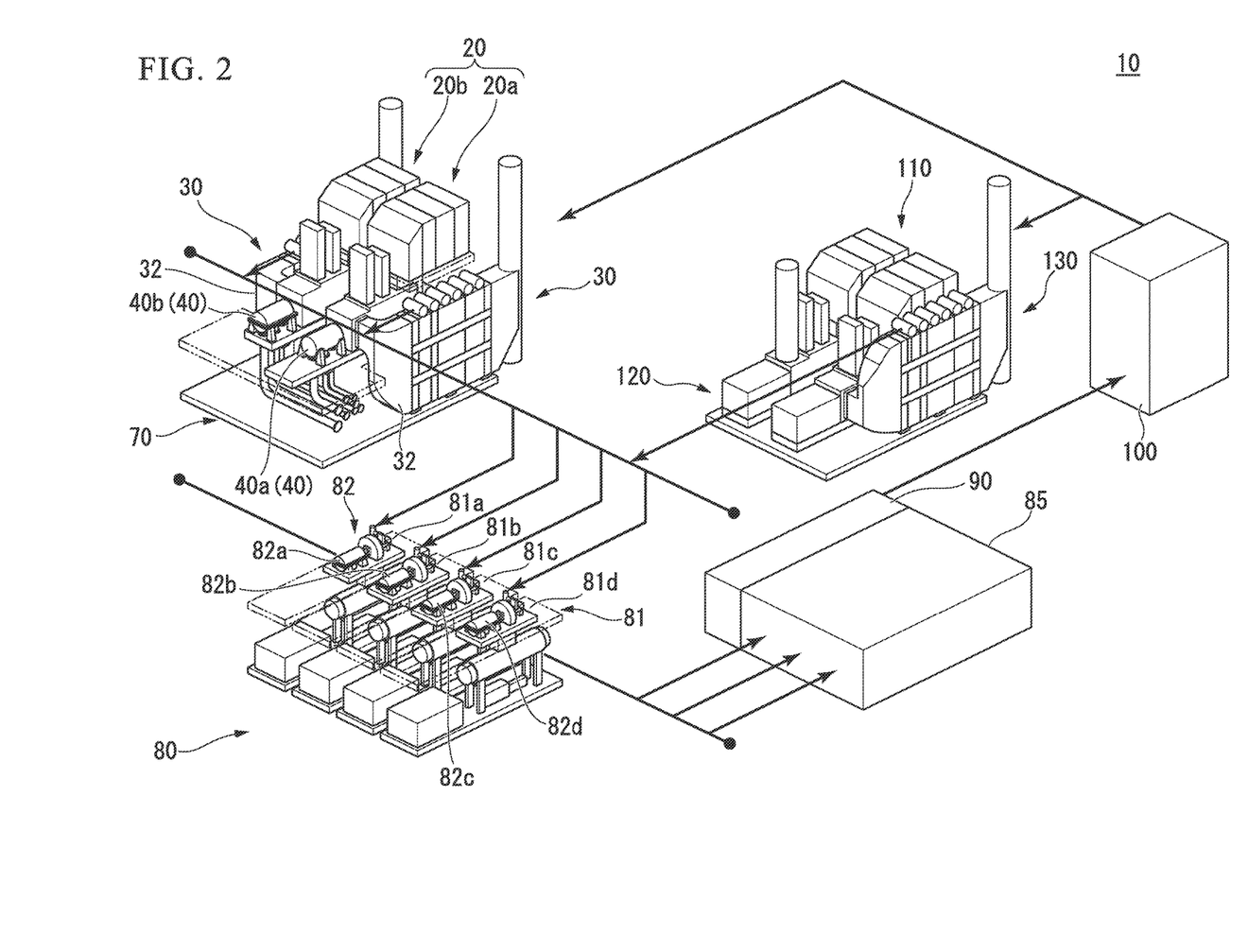
FIG. 2 is a schematic diagram representing a GTCC facility in the floating liquefied-gas production facility.
Figure 7:
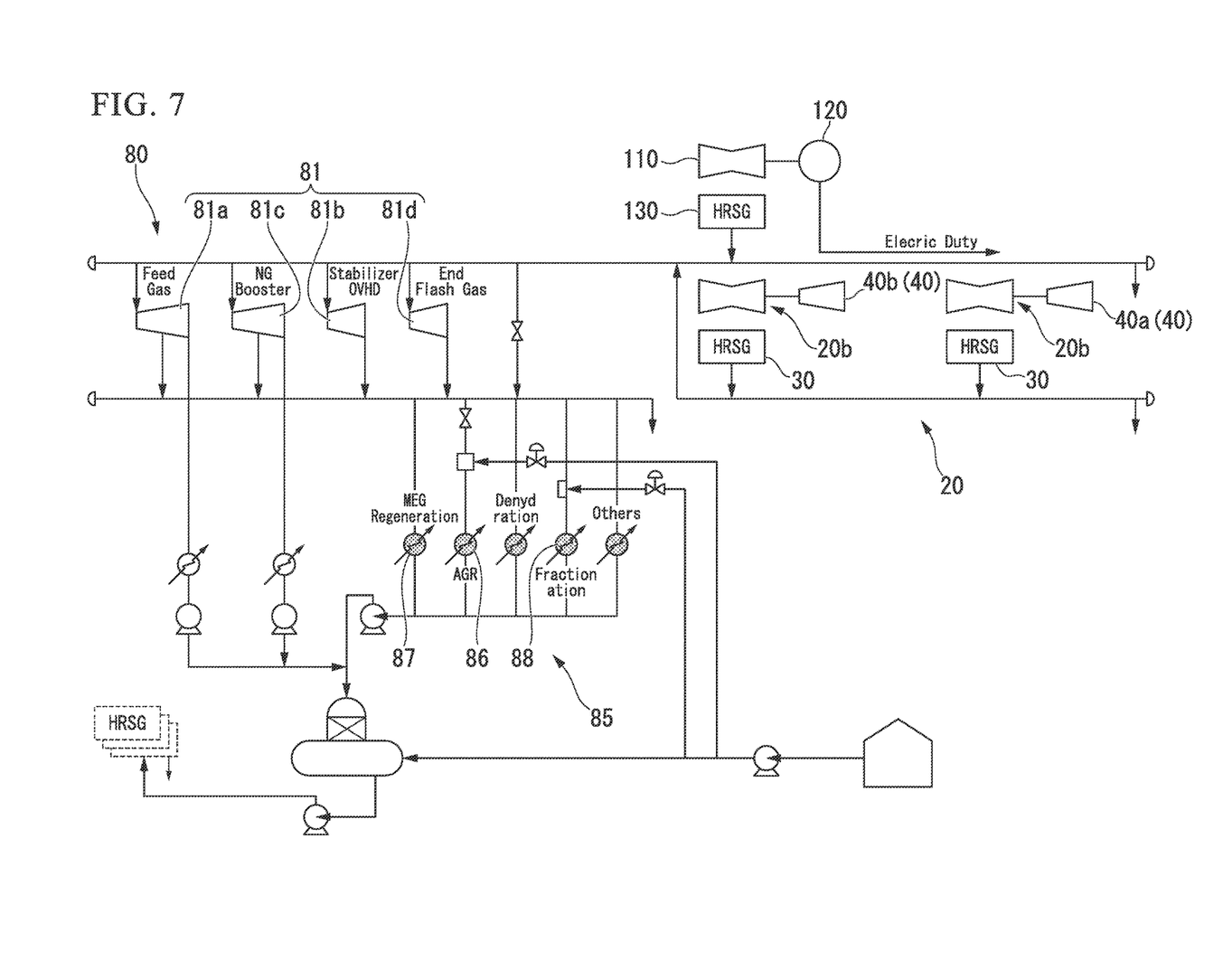
FIG. 7 is a system diagram representing the GTCC facility.

An embodiment of the present invention will be described. FIG. 1 is a schematic view representing the floating liquefied-gas production facility of this embodiment. FIG. 2 is a schematic diagram representing the GTCC facility in the floating liquefied-gas production facility. FIGS. 3 to 6 are schematic diagrams representing a part of the GTCC facility. FIG. 7 is a system diagram representing the GTCC facility.

The floating liquefied-gas production facility 1 of this embodiment shown in FIG. 1 is a facility which produces liquefied natural gas by purifying and liquefying the gas extracted from the ocean floor.

As shown in FIG. 1, the floating liquefied-gas production facility 1 is equipped with a ship (a floating body) F which is used in an extraction site of liquefied natural gas in the ocean, and a GTCC facility 10 installed on the ship F.

Figure 3:
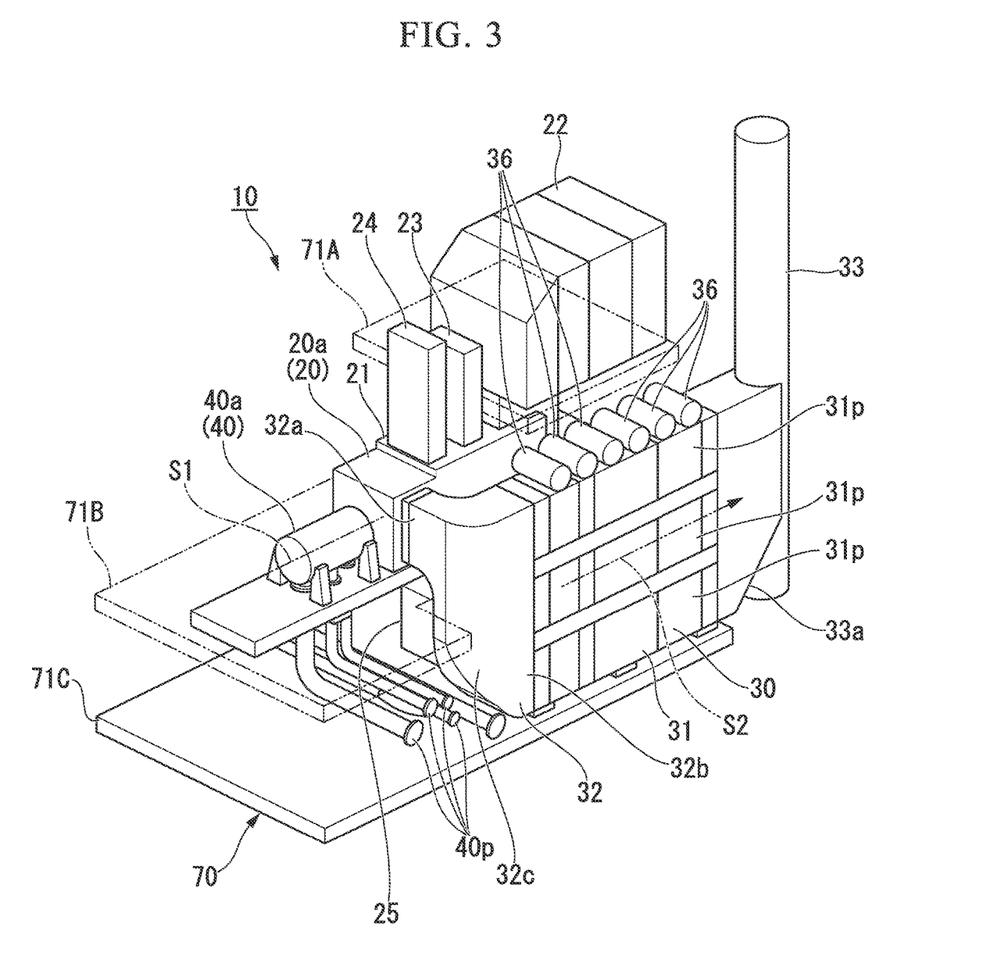
FIG. 3 is a schematic diagram representing a part of the GTCC facility.

As shown in FIGS. 2 and 3, the GTCC facility 10 includes a gas turbine unit 20, a heat recovery boiler 30, an exhaust connection duct 32, a refrigeration compressor 40, a deck 70, an auxiliary drive unit 80, a component separation system 85, a liquefaction device 90, and a fuel gas supply device 100.

The gas turbine unit 20 is driven using natural gas as a fuel. That is, the gas turbine unit 20 rotationally drives a turbine shaft with a combustion gas generated by combusting a mixed gas which is obtained by mixing the compressed air and the fuel gas.

An intake duct 22 which sucks air into an enclosure 21 is provided in the gas turbine unit 20.

In the enclosure 21, a combustor (not shown) which compresses the sucked air and combusts a mixture gas obtained by mixing the compressed air and the fuel gas, a turbine shaft (not shown) having a plurality of turbine blades and the like are provided. Furthermore, a ventilation intake duct 23 and a ventilation exhaust duct 24 for cooling a monitoring instrument or the like of the gas turbine unit 20 with the air are provided in the enclosure 21 of the gas turbine unit 20 to protrude upward.

In this embodiment, the gas turbine unit 20 is equipped with a turbine 20a which drives a refrigeration compressor configured to compress the refrigerant utilized in a pre-cooling process which is a previous process in the process of cooling the natural gas, and a turbine 20b which drives the refrigeration compressor configured to compress the refrigerant used in a main cooling process which is a subsequent process in the process of cooling the natural gas.

Further, in this embodiment, a second gas turbine unit 110 (see FIG. 2) for providing power consumed in the GTCC facility 10 and the ship F (see FIG. 1) is provided in the GTCC facility 10.

The second gas turbine unit 110 shown in FIG. 2 is a unit which uses the natural gas as a fuel and has the same configuration as the gas turbine unit 20, and the rotational force of the turbine shaft of the second gas turbine unit 110 is used as the power which drives the generator 120.

Further, a configuration in which a part of the rotational force of the turbine shaft of the gas turbine unit 20 is used as the power of the generator 120 without including the second gas turbine unit 110 may be adopted.

An exhaust heat recovery boiler 30 shown in FIGS. 2 and 3 recovers the exhaust heat of the exhaust gas from the gas turbine unit 20 to generate steam. That is, the exhaust heat recovery boiler 30 includes a boiler body 31 having a vaporizer which evaporates water by heat of the exhaust gas from the gas turbine unit 20 to generate the steam, an exhaust connection duct (exhaust duct) 32 for introducing the exhaust gas discharged from the gas turbine unit 20 into the boiler body 31, and an exhaust pipe 33 which exhausts the exhaust gas discharged from the boiler body 31 to the outside via the connection duct 33a.

Figure 4:
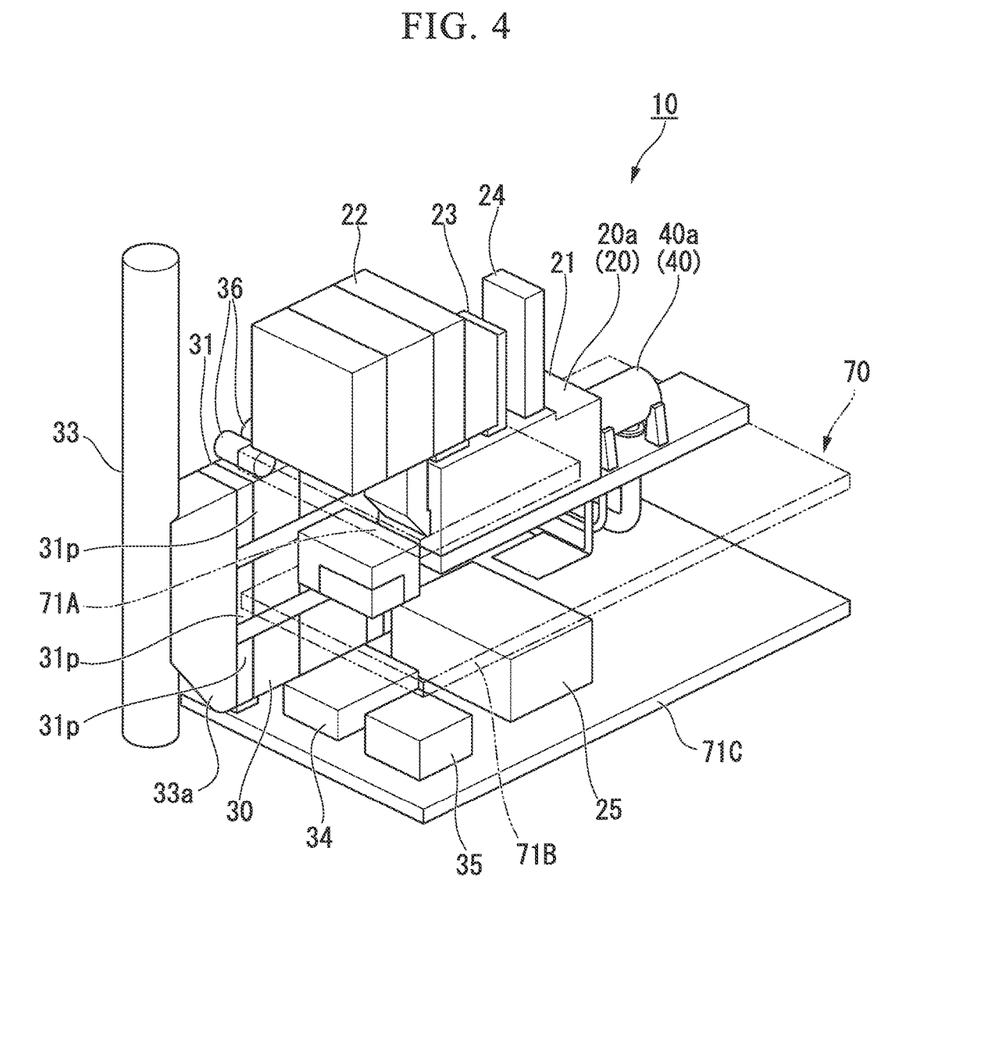
FIG. 4 is a schematic diagram representing a part of the GTCC facility.

As shown in FIGS. 3 and 4, the exhaust heat recovery boiler 30 may further include a feed pump unit 34 which supplies water to the boiler body 31, a fuel valve unit 35 which supplies fuel for combusting the exhaust gas in the boiler body 31, a steam-water separation drum (a steam-water separator) 36 which separates the steam generated in the boiler body 31 from the liquid (water) and the like.

Further, in this embodiment, as shown in FIG. 2, a second exhaust heat recovery boiler 130 which generates steam from the exhaust heat is provided in the GTCC facility 10, similarly to the exhaust heat recovery boiler 30. The second exhaust heat recovery boiler 130 is a device which generates steam using the exhaust heat from the second gas turbine unit 110. The steam generated by the second exhaust heat recovery boiler 130 is mixed with steam generated by the exhaust heat recovery boiler 30 and can be used as a heat source.

Also, the GTCC facility 10 is provided with a lubricant supply unit 25 (see FIG. 4) which supplies the lubricant for lubricating a bearing unit or the like in the gas turbine unit 20 and the gas compressor 40.

The GTCC facility 10 sucks and compresses air from the intake duct 22 in the gas turbine unit 20, and rotationally drives a turbine shaft (not shown) with the combustion gas generated by combusting a mixed gas which is obtained by mixing the compressed air and the fuel gas.

In this embodiment, a pre-cooling process turbine 20a shown in FIG. 2 operates the compressor 40a which compresses the mixed refrigerant for the pre-cooling process, and a turbine 20b for the main cooling process operates the compressor 40b which compresses the mixed refrigerant for the main cooling process.

The exhaust air from the gas turbine unit 20 is sent to the boiler body 31 via the exhaust connection duct 32. In the boiler body 31, by heat-exchange with heat of the exhaust gas in an evaporator (not shown), water sent by the feed pump unit 34 is heated to generate steam.

The exhaust gas in which a temperature is lowered via the boiler body 31 is discharged from the exhaust pipe 33 into the atmosphere.

Incidentally, the deck 70 in the GTCC facility 10 holds each device in the following layout.

That is, the deck 70 includes base members 71A, 71B and 71C of a plurality of layers (three layers in this embodiment) in a vertical direction between a plurality of struts (not shown).

The base member 71A is a member of an uppermost layer of the base members 71A, 71B and 71C. The base member 71B is a member of an intermediate layer of the base members 71A, 71B and 71C. The base member 71C is a member of a lowermost layer of the base members 71A, 71B and 71C.

The intake duct 22 is installed on the base member 71A of the uppermost layer.

The gas turbine unit 20 and the gas compressor 40 are installed on the base member 71B of the intermediate layer.

The exhaust heat recovery boiler 30 is installed on the base member 71C of the lowermost layer.

Further, in the base member 71C of the lowermost layer, below the base member 71B of the intermediate layer on which the gas turbine unit 20 is installed, auxiliary devices such as a lubricant supply unit 25, a feed pump unit 34 and a fuel valve unit 35 are disposed. That is, at least a part of the auxiliary device of the gas turbine unit 20 and the auxiliary device of the exhaust heat recovery boiler 30 is located below the gas turbine unit 20. In addition, a piping 40p or the like connected to the gas compressor 40 or the like is also disposed between the base member 71C of the lowermost layer and the base member 71B of the intermediate layer.

When viewed in a plan view, the gas turbine unit 20 and the exhaust heat recovery boiler 30 are disposed in parallel to each other so that a turbine axial direction Si of the gas turbine unit 20 and a flow direction S2 of the exhaust gas in the exhaust heat recovery boiler 30 are parallel to each other. Further, the boiler body 31 of the exhaust heat recovery boiler 30 installed on the base member 71C of the lowermost layer has a height which reaches the upper part of the base member 71B of the intermediate layer. Thus, the exhaust heat recovery boiler 30 is at least partially disposed at the same position as the gas turbine unit 20 in the height direction. In other words, the exhaust heat recovery boiler 30 is provided to be at least partially located in the same plane of the same height as the gas turbine unit 20.

Here, the flow direction of the combustion gas in the turbine axial direction Si of the gas turbine unit 20 and the flow direction S2 of the exhaust gas of the exhaust heat recovery boiler 30 are disposed to be opposite to each other and parallel to each other. Thus, as shown in FIG. 3, the exhaust connection duct 32 configured to guide the exhaust gas of the gas turbine unit 20 to the exhaust heat recovery boiler 30 is provided such that a portion between one end 32a connected to a discharge port of the gas turbine unit 20 and the other end 32b connected to an intake port 30b of the exhaust heat recovery boiler 30 is provided as a direction changing section 32c which changes the direction of flow of the exhaust gas by the gas turbine unit 20 and the exhaust heat recovery boiler 30.

Figure 5:
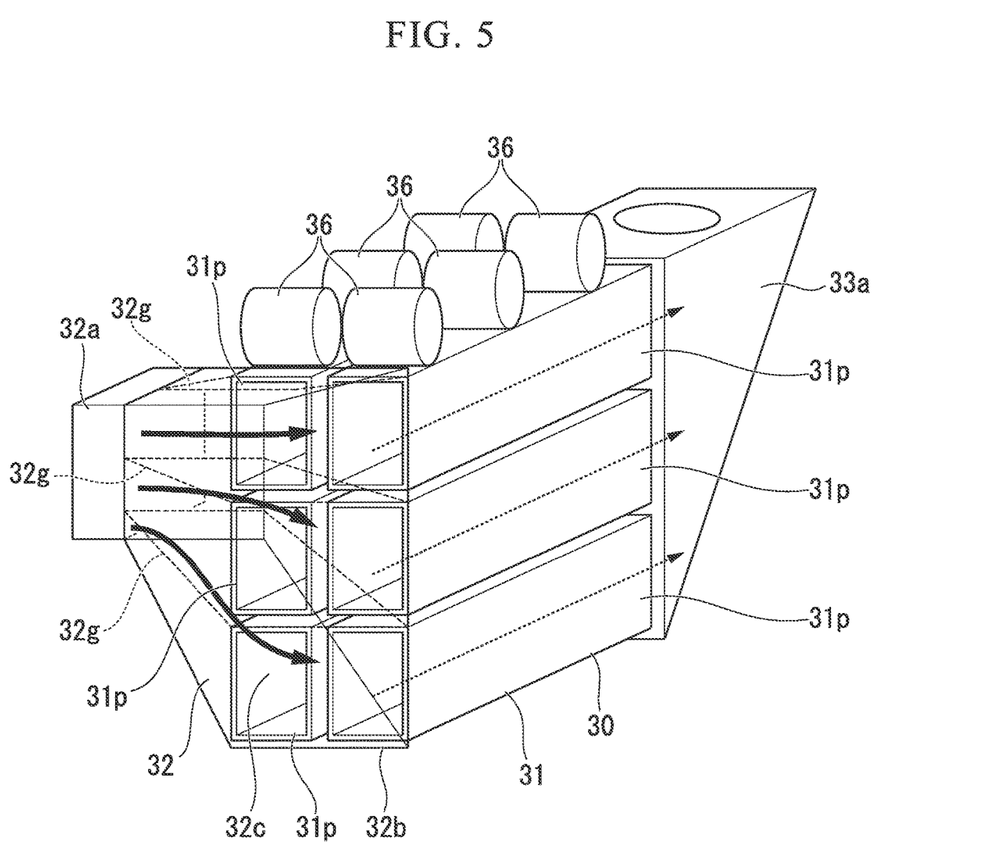
FIG. 5 is a schematic diagram representing a part of the GTCC facility.
Figure 6:
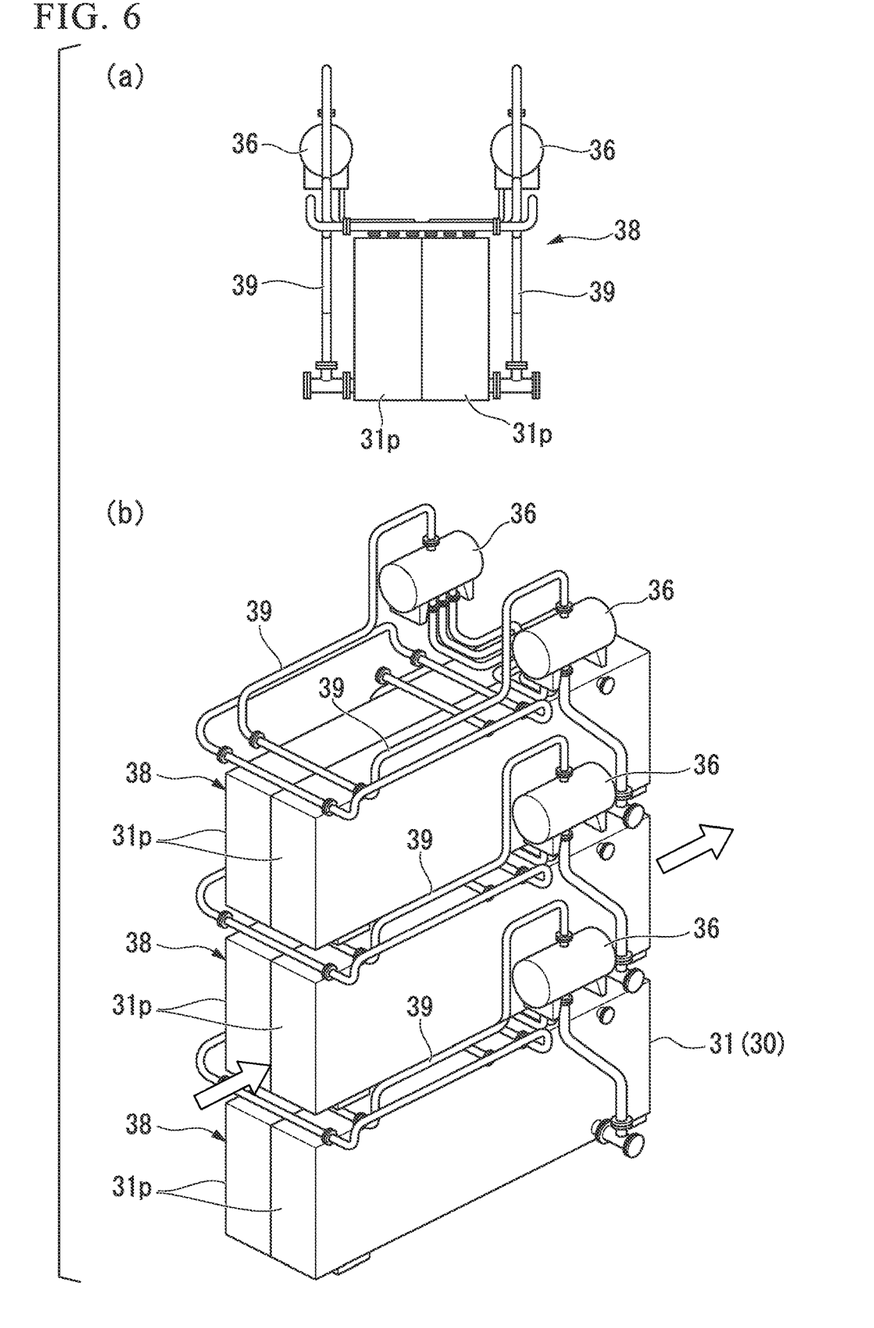
FIG. 6 is a schematic diagram representing a part of the GTCC facility.

Meanwhile, as shown in FIG. 5, the boiler body 31 of the exhaust heat recovery boiler 30 is a drum-circulation-type boiler which includes a plurality of boiler units 31p, and a steam-water separation drum 36 to be described later. Each boiler unit 31p includes an evaporator (not shown) which heats water by the heat-exchange with the exhaust gas fed from the exhaust connection duct 32 to generate the steam.

In this embodiment, the boiler body 31 is configured so that six boiler units 31p are laminated in three stages in a height direction in the state in which the directions of the boiler units are aligned, and are disposed in two rows in the width direction perpendicular to the flow direction S2 of the exhaust gas.

Accordingly, the exhaust connection duct 32 is formed so that a flow passage width and a flow passage height thereof gradually increase toward the other end 32b from the one end 32a. Further, guide vanes 32g are preferably provided in the exhaust connection duct 32. The guide vanes 32g divide the interior of the exhaust connection duct 32 into two parts in the flow passage width direction and into three parts in the flow passage height direction to send the exhaust gas to each boiler unit 31p as evenly as possible. Thus, the exhaust gas is evenly introduced into each boiler unit 31p from the gas turbine unit 20 (see FIG. 3).

Steam-water separation drums 36 of the same number of the boiler units 31p are installed above the boiler body 31 made up of an assembly of the plurality of boiler units 31p.

Further, a single steam-water separation drum 36 is connected to each boiler unit 31p. Each steam-water separation drum 36 separates a mixture of steam and water generated in the boiler unit 31p into steam and water in the steam-water separation drum 36, sends the steam to a steam turbine unit 81 to be described later (see FIG. 2), and circulates and supplies water to the boiler unit 31p again. Each boiler unit 31p has a steam-water separation drum 36, and constitutes an independent circulation cycle.

Since the distance to the steam-water separation drum 36 is different in each boiler unit 31p, in order to make an amount of circulation of water from the steam-water separation drum 36 to the boiler unit 31p constant, a circulation pump (not shown) is provided. Meanwhile, since the distances to the steam-water separation drum 36 are identical to each other in FIG. 6, a natural circulation type boiler may be adopted, and a circulation type pump may be unnecessary.

In each boiler unit 31p of the exhaust heat recovery boiler 30, the generated steam pressure, for example, is preferably set to a low pressure of approximately 40 bar. As the generated steam pressure is high, it is necessary to increase the thickness of the material of the boiler unit 31p, which leads to an increase in weight. Therefore, by setting the steam pressure to a low pressure, the thickness of the material of the boiler unit 31p is reduced to attain a reduction in weight.

In the GTCC facility 10, an auxiliary combustion device (not shown) may be provided in each boiler unit 31p of the exhaust heat recovery boiler 30. By supplying fuel to the auxiliary combustion device in each boiler unit 31p using the fuel valve unit 35 to combust the exhaust gas, it is possible to increase an amount of the steam generation. Moreover, by adjusting the amount of fuel supply from the fuel valve unit 35, it is also possible to adjust the amount of the steam generation.

As described above, the exhaust heat recovery boiler 30 is disposed at least partially at the same position in the height direction as the gas turbine unit 20, and the gas turbine unit 20 and the exhaust heat recovery boiler 30 are disposed in parallel to each other. Thus, the installation floor area of the GTCC facility 10 is suppressed to be small, and compared to a case in which the gas turbine unit 20 and the exhaust heat recovery boiler 30 are laminated, the height thereof is limited to be low. Thus, the low center of gravity is attained in the GTCC facility 10 of this embodiment.

Also, the stability of the ship F equipped with the GTCC facility 10 is improved by the low center of gravity of the GTCC facility 10.

In this embodiment, the boiler body 31 of the exhaust heat recovery boiler 30 is configured so that the plurality of boiler units 31p are provided in parallel in the vertical direction and the width direction. When the boiler body 31 is divided into a plurality of units, compared to the case in which the boiler body 31 is not divided, a relation of V ∝ (Sc)² between a processing capacity V of the exhaust gas and a scale ratio Sc holds, and a relation of W1 ∝ (Sc)³ between the weight W1 of the boiler unit 31p and the scale ratio Sc holds.

Thus, the weight ratio W2 of the boiler body 31 as compared to the case in which the boiler body 31 is not divided is as follows.

$$W2 =$$
$$(\text{number } N \text{ of boiler units 31 p}) \times (\text{weight } W1 \text{ of boiler unit 31 p}) =$$
$$(\text{number } N \text{ of boiler units 31 p}) \times (\text{processing capacity } V)^{3/2}.$$

In the example shown above, since the boiler body 31 is divided into six units, compared to the case in which the boiler body 31 is not divided, the processing capacity V of the boiler unit 31p is V=1/6. Thus, the weight ratio W2 of the boiler body 31 as compared to the weight of the boiler body 31 when the boiler body 31 is not divided is W2=6×(1/6)$^{3/2}$=0.41, and compared to the case in which the boiler body 31 is not divided, the weight of the boiler body 31 is equal to or less than half.

Further, a ratio A1/A2 of an installation floor area A1 of the exhaust heat recovery boiler 30 to an installation floor space A2 when the boiler body 31 is not divided is as follows:

$$A1/A2 = (Sc)^2 \times (\text{number of columns } L \text{ of boiler unit 31 p}) =$$
$$(\text{processing capacity } V) \times (\text{number of columns } L \text{ of boiler unit 31 p}).$$

Thus, in the example shown above, since the processing capacity is V=1/6, and the number of columns L of the boiler unit 31p is L=2, the ratio A1/A2 of the installation floor area A1 of the exhaust heat recovery boiler 30 to the installation floor space A2 when the boiler body 31 is not divided is A1/A2=1/6×2=0.33. That is, compared to the case in which the boiler body 31 is not divided, the installation floor area of the exhaust heat recovery boiler 30 is equal to or less than half.

In the case of the overwater facility, conventionally, a once-through boiler capable of attaining the light weight is adopted because of the weight problem, but since there is no drum, superheated steam is necessarily required, there is a need for high-precision boiler automatic control, and the performance is also bad. Meanwhile, in this embodiment, in the drum-circulation-type exhaust heat recovery boiler 30, by configuring the boiler body 31 by providing the plurality of boiler units 31p in parallel in the vertical direction and the width direction, even when the boilers are placed horizontally (a flow in which the flow direction of the exhaust gas in the boiler is parallel to the horizontal plane), it is possible to reduce the weight while reducing the installation floor space of the drum-circulation-type exhaust heat recovery boiler 30.

Further, when the exhaust heat recovery boiler is constituted by a boiler unit, and only one evaporator and one steam-water separator are included, the evaporator and the steam-water separator may increase in size. In contrast, by including an evaporator (not shown) and the steam-water separation drum 36 in each of the plurality of boiler units 31p, the size of the evaporator and the steam-water separation drum 36 is reduced, and the degree of freedom of the installation space increases, which can also contribute to the miniaturization of the exhaust heat recovery boiler 30.

In addition, in the GTCC facility 10, at least a part of the auxiliary machines, such as the lubricant supply unit 25, the feed pump unit 34 and the fuel valve unit 35 is disposed below the gas turbine unit 20.

Thus, it is possible to more remarkably achieve the aforementioned effect of enabling the effective utilization of the space in the GTCC facility 10 and enabling a low center of gravity while limiting the installation floor space.

Also, since at least a part of the auxiliary machines such as the lubricant supply unit 25, the feed pump unit 34 and the fuel valve unit 35 is disposed below the gas turbine unit 20, the exhaust heat recovery boiler 30 is configured so that other machines are not disposed in the upper part thereof. Thus, when the maintenance such as replacement of the various types of piping connected to the exhaust heat recovery boiler 30 is performed, it is not necessary to remove other machines, and the maintenance is improved.

As shown in FIG. 2, the auxiliary drive unit 80 generates a driving force of the auxiliary machine of the GTCC facility 10 using the thermal energy of the steam generated by the exhaust heat recovery boiler 30. That is, the auxiliary drive unit 80 has a steam turbine unit 81 driven by the steam generated by the exhaust heat recovery boiler 30, and an auxiliary compressor 82 driven by the steam turbine unit 81. Further, the auxiliary drive unit 80 of this embodiment can also use the steam generated by the second exhaust heat recovery boiler 130.

In this embodiment, the steam turbine unit 81 includes a first steam turbine unit 81a which drives a first auxiliary compressor 82a to be described later, a second steam turbine unit 81b which drives a second auxiliary compressor 82b to be described later, a third steam turbine unit 81c which drives a third auxiliary compressor 82c to be described later, and a fourth steam turbine unit 81d which drives a fourth auxiliary compressor 82d to be described later.

The auxiliary compressor 82 has a first auxiliary compressor 82a which compresses the raw natural gas and supplies it to an acid gas removal device 86 to be described later, a second auxiliary compressor 82b which compresses a condensate gas to separate a heavy component from the condensate gas made up of the condensate gas which is a gas containing the heavy component (condensate), a third auxiliary compressor 82c which sends the raw natural gas to a refrigerator 90 to be described later, and a fourth auxiliary compressor 82d which is a part of the fuel gas supply device 100 and compresses the end-flash gas and the boil-off gas.

The component separation system 85 shown in FIGS. 2 and 7 is a system which purifies the natural gas using the thermal energy of the steam generated in at least one of the exhaust heat recovery boiler 30 and the second exhaust heat recovery boiler 130. The component separation system 85 uses the steam utilized in the steam turbine unit 81 as a heat source.

Specifically, the component separation system 85 has at least an acid gas removal device 86 which removes the acid gas contained in the raw natural gas extracted from the ocean floor, an antifreeze recycling device 87 which recovers and recycles antifreeze added to the natural gas when the natural gas is extracted, and a fractionator 88 which fractionates the natural gas.

Since the acid gas removal device 86, the antifreeze recycling device 87 and the fractionator 88 use the steam generated by the exhaust heat recovery boiler 30 and the second exhaust heat recovery boiler 130 as a heat source, another boiler or the like configured to supply the heat source to each device is not necessarily required.

The acid gas removed from the raw natural gas by the acid gas removal device 86 is, for example, hydrogen sulfide, carbon dioxide or the like.

The antifreeze recovered from the raw natural gas by the antifreeze recycling device 87 and recycled, for example, is monoethylene glycol or the like.

The fractionator 88 separates the raw natural gas into, for example, ethane, propane, butane and condensate.

The liquefaction device 90 shown in FIG. 2 is a device which cools the natural gas using the refrigerant compressed by the gas turbine unit 20.

Most natural gas in the liquefaction device 90 is liquefied, but the end-flash gas remaining in a gaseous state without being liquefied is supplied to the fuel gas supply device 100. The natural gas liquefied by the liquefaction device 90 is supplied to storage equipment (not shown).

The fuel gas supply device 100 shown in FIG. 2 compresses the end-flash gas remaining as a gas after the process of liquefaction of natural gas in the liquefaction device 90, and the boil-off gas generated by vaporization of the liquefied natural gas in the storage equipment of the liquefied natural gas, and supplies the gases to the gas turbine unit 20 and the second gas turbine unit 110 as a fuel.

Further, in this embodiment, when the end-flash gas and the boil-off gas are insufficient, the fuel gas supply device 100 may vaporize the liquefied natural gas and may supply it to the gas turbine unit 20 and the second gas turbine unit 110 as a fuel.

Although it is not essential for the present invention, when a combustible gas is separated as an impurity in the component separation system 85, if the combustible gas is capable of being used as a fuel in the gas turbine unit 20 and the second gas turbine unit 110, the fuel gas supply device 100 may supply the combustible gas to the gas turbine unit 20 and the second gas turbine unit 110 as a fuel.

Next, the process of liquefaction of natural gas using the floating liquefied-gas production facility 1 of this embodiment will be described in detail focusing on the use of energy in the floating liquefied-gas production facility 1.

In this embodiment, the floating liquefied-gas production facility 1 shown in FIG. 1 supplies the driving force, heat and power using a gas (raw natural gas) extracted from the ocean floor by the floating liquefied-gas production facility 1 as an energy source. Further, when sufficient raw natural gas is not obtained at the initial time of extraction of the raw natural gas, the floating liquefied-gas production facility 1 of this embodiment may be operated by receiving the supply of the natural gas from the outside if necessary.

That is, as shown in FIG. 7, in the floating liquefied-gas production facility 1, the gas turbine units 20 and 110 are driven by consuming the natural gas, the gas compressor 40 and the generator 120 are driven by the driving force generated by the gas turbine units 20 and 110, respectively, and the auxiliary drive unit 80 and the component separation system 85 are operated by exhaust heat from the gas turbine units 20 and 110.

Specifically, the steam generated by the exhaust heat recovery boiler 30 of this embodiment, for example, is used in the component separation system 85 as a heat source of a device for removing the acid gas components contained in the natural gas and a device for recovering and recycling the antifreeze added to the raw natural gas when the gas (raw natural gas) is extracted from the ocean floor after extraction of the raw natural gas, and a heat source of a device which fractionates other hydrocarbon compounds, such as ethane, propane and butane, from the raw natural gas. Further, the steam generated by the exhaust heat recovery boiler 30 is used as the driving energy of the steam turbine unit 81 which drives a feed gas compressor (a first auxiliary compressor 82a), a stabilizer overhead compressor (a second auxiliary compressor 82b), a natural gas booster compressor (a third auxiliary compressor 82c) and an end-flash gas compressor (a fourth auxiliary compressor 82d) belonging to the auxiliary machines.

Thus, the floating liquefied-gas production facility 1 of this embodiment utilizes a part of the gas extracted from the ocean floor as the fuel required to drive the gas turbine units 20 and 110, and further uses the exhaust heat generated when the gas turbine units 20 and 110 are driven as a power source and a heat source used in the process of purification and liquefaction of natural gas. Thus, an amount of energy discarded without used is less than in the related art, and the efficiency is good. Furthermore, in this embodiment, since the exhaust heat of the gas turbine units 20 and 110 is a heat source for the component separation system 85, there is no need to provide another boiler to secure a heat source of the component separation system 85. Therefore, in the floating liquefied-gas production facility 1 of this embodiment, the facility is small.

Further, the steam turbine unit 81 driven by steam from the exhaust heat recovery boilers 30 and 130 is provided in the floating liquefied-gas production facility 1 of this embodiment, and the auxiliary compressor 82 is operated by the steam turbine unit 81. Thus, the compression of gas in the process until a gas is extracted from the ocean floor and is liquefied and purified as natural gas can be performed by utilizing the exhaust heat of the gas turbine units 20 and 110 as an energy source. Therefore, compared to a conventional system in which the auxiliary compressor 82 is driven by an electric motor, since an extra generator configured to supply the power of the electric motor is not required to be provided in the facility, it is possible to miniaturize the size of the facility, and the required fuel can also be reduced.

Also, since it is possible to supply the power of the floating liquefied-gas production facility 1 by the second gas turbine unit 110 that is driven using a part of the gas extracted from the ocean floor as a fuel, compared to the case in which a generator that requires fuel other than the natural gas is provided within the facility, since there is no need for fuel storage equipment, it is possible to further miniaturize the size of the facility.

While embodiments of the present invention have been described in detail with reference to the accompanying drawings, the specific configuration is not limited to the embodiments, and design modifications are also included without departing from the scope of the present invention.

For example, in each embodiment described above, although the primary refrigeration compressor and the generator were driven by a gas turbine, and the auxiliary compressor was driven by a steam turbine, they are not limited thereto, and the primary refrigeration compressor may be driven by a gas turbine, and others may be driven by a steam turbine.

For example, in each embodiment described above, although an example in which the GTCC facility 10 is provided on the ship F has been described, the GTCC facility 10 may be provided in any overwater facility, as long as it is equipped with a floating body (a float), such as a float structure, without being limited to the ship F.

INDUSTRIAL APPLICABILITY

The present invention can be used as a facility for mining fuel resources at a location where refueling from the outside is difficult.

REFERENCE SYMBOLS

1 Floating liquefied-gas production facility
10 GTCC facility
20 Gas turbine unit
21 Casing
22 Intake duct
23 Cooling intake duct
24 Cooling exhaust duct
25 Lubricant supply unit
30 Exhaust heat recovery boiler (HRSG)
30*b* Intake port
31 Boiler body
31*p* Boiler unit
32 Exhaust connection duct (exhaust duct)
32*a* One end
32*b* Other end
32*c* Section
32*g* Guide vane
33 Exhaust pipe
33*a* Connection duct
34 Feed pump unit
35 Fuel valve unit
36 Steam-water separation drum (steam-water separator)
40 Compressor
40*p* Piping
70 Support frame
71A, 71B, 71C Base member
80 Auxiliary drive unit
81 Steam turbine section
81*a* First steam turbine
81*b* Second steam turbine
81*c* Third steam turbine
81*d* Fourth steam turbine
82 Auxiliary compressor
82*a* First auxiliary compressor (feed gas compressor)
82*b* Second auxiliary compressor (stabilizer overhead compressor)
82*c* Third auxiliary compressor (natural gas booster compressor)
82*d* Fourth auxiliary compressor (end-flash gas compressor)
85 Component separation system
86 Acid gas removal device
87 Antifreeze recycling device
88 Fractionator
90 Refrigerator
100 Fuel gas supply system
110 Second gas turbine unit
120 Generator
130 Second heat recovery boiler (HRSG)
F Ship (floating body)

The invention claimed is:

1. A floating liquefied-gas production facility comprising: a deck including base members of a plurality of layers in a vertical direction, the plurality of layers including an uppermost layer, an intermediate layer and a lowermost layer: a gas turbine unit having an intake duct that sucks air into an enclosure of the gas turbine unit; a liquefaction device which has a primary refrigeration compressor driven by the gas turbine unit and is configured to cool natural gas;
   a drum circulation type exhaust heat recovery device configured to recover energy of exhaust heat of the gas turbine unit as steam;
   a component separation system configured to separate components in the natural gas extracted from an ocean floor using the steam generated by the drum circulation type exhaust heat recovery device as a heat source and configured to send the separated components to the liquefaction device by using exhaust heat; and
   a fuel gas supply device configured to compress at least one of an end-flash gas and a boil-off gas and supply the at least one of the end flash gas and the boil-off gas to the gas turbine unit as a fuel,
   wherein the intake duct is installed on the base member of the uppermost layer, wherein the gas turbine unit and the primary refrigeration compressor are installed on the base member of the intermediate layer,
   wherein the drum circulation type exhaust heat recovery device is installed on the base member of the lowermost layer,
   wherein the drum circulation type exhaust heat recovery device has a height that reaches an upper part of the base member of the intermediate layer, and
   wherein the drum circulation type exhaust heat recovery device is disposed at least partially at the same position of the gas turbine unit in the height direction, and the gas turbine unit and the drum circulation type exhaust heat recovery device are disposed in parallel to each other wherein the component separation system comprises a fractionator configured to fractionate the natural gas: and
   an auxiliary compressor as a natural gas booster compressor configured to send the natural gas to the liquefaction device, and
   wherein the fractionator and the natural gas booster compressor are configured to use the steam generated by the exhaust heat recovery device as the heat source.

2. The floating liquefied-gas production facility of claim 1, wherein
   the drum circulation type exhaust heat recovery device is horizontally installed.

3. The floating liquefied-gas production facility of claim 1, wherein
   the component separation system comprises:
   an acid gas removal device configured to remove an acid gas contained in the natural gas extracted from the ocean floor; and
   an antifreeze recycling device configured to recover and recycle antifreeze added when the natural gas is extracted;
   wherein the acid gas removal device and the antifreeze recycling device are configured to use the steam generated by the exhaust heat recovery device as the heat source.

4. The floating liquefied-gas production facility of claim 3, further comprising:
   a steam turbine configured to be driven by the steam generated by the exhaust heat recovery device; and
   at least one of the auxiliary compressor and a main generator driven by the steam turbine, wherein the component separation system is configured to use the steam used in the steam turbine as the heat source.

5. The floating liquefied-gas production facility of claim 4, wherein
the auxiliary compressor comprises:
a feed gas compressor configured to compress the natural gas supplied to the acid gas removal device,
a stabilizer overhead compressor configured to compress a condensate gas,
the natural gas booster compressor configured to supply the natural gas to the liquefaction device, and
an end-flash gas compressor configured to compress an end-flash gas and the boil-off gas in the fuel gas supply device.

6. The floating liquefied-gas production facility of claim 1, wherein the drum circulation type exhaust heat recovery device comprises:
a boiler body;
an exhaust connection duct for introducing exhaust gas discharged from the gas turbine unit into the boiler body; and
an exhaust pipe that exhausts the exhaust gas discharged from the boiler body to an outside, wherein the exhaust connection duct comprises a direction changing section configured to change a flow direction of the exhaust gas so that a flow direction of the exhaust gas from the gas turbine unit is opposite to a flow direction of the exhaust gas into the exhaust heat recovery device.

7. The floating liquefied-gas production facility of claim 6 further comprising:
guide vanes that are provided in the exhaust connection duct,
wherein the guide vanes divide an interior of the exhaust connection duct into a plurality of parts in a flow passage width direction and into a plurality of parts in a flow passage height direction.

8. The floating liquefied-gas production facility of claim 6, wherein the boiler body has a plurality of boiler units,
wherein the plurality of boiler units are laminated in a plurality of stages in a height direction in the state in which the directions of the plurality of boiler units are aligned, and the plurality of boiler units are disposed in a plurality of rows in a width direction perpendicular to the flow direction of the exhaust gas.

9. The floating liquefied-gas production facility of claim 6, wherein the boiler body further includes a plurality of boiler units and a steam-water separation drum, wherein the steam-water separation drum has the same number of the boiler units.

\* \* \* \* \*